(12) United States Patent
Gao et al.

(10) Patent No.: US 6,724,969 B2
(45) Date of Patent: Apr. 20, 2004

(54) METHOD OF FABRICATING POLYMER OPTICAL CHANNEL WAVEGUIDES WITH MULTIPLE TYPES OF WAVEGUIDE CORE MATERIALS

(75) Inventors: Renyuan Gao, Strafford, PA (US); Joseph E. Maenner, Thorndale, PA (US)

(73) Assignee: Photon-X, Inc., Malvern, PA (US)

( * ) Notice: Subject to any disclaimer, the term of this patent is extended or adjusted under 35 U.S.C. 154(b) by 142 days.

(21) Appl. No.: 10/004,652

(22) Filed: Dec. 4, 2001

(65) Prior Publication Data

US 2003/0026577 A1 Feb. 6, 2003

Related U.S. Application Data

(60) Provisional application No. 60/309,849, filed on Aug. 3, 2001.

(51) Int. Cl.[7] ............................................... G02B 6/10
(52) U.S. Cl. ................................ 385/131; 385/132
(58) Field of Search ................................ 385/129–132

(56) References Cited

U.S. PATENT DOCUMENTS

| | | | |
|---|---|---|---|
| 4,277,272 A | 7/1981 | Schneider | |
| 4,436,368 A | 3/1984 | Keck | |
| 5,497,445 A | * 3/1996 | Imoto | 385/143 |
| 5,546,480 A | 8/1996 | Leonard | |
| 5,822,488 A | 10/1998 | Terasawa et al. | |
| 5,825,525 A | 10/1998 | Harwit | |
| 5,892,859 A | * 4/1999 | Grote | 385/2 |
| 5,896,484 A | 4/1999 | Borrelli et al. | |
| 6,062,046 A | 5/2000 | Terasawa et al. | |
| 6,243,518 B1 | 6/2001 | Lee et al. | |
| 6,253,015 B1 | 6/2001 | Ukrainczyk | |
| 6,310,999 B1 | * 10/2001 | Marcuse et al. | 385/42 |
| 6,311,004 B1 | 10/2001 | Kenney et al. | |
| 6,324,314 B1 | * 11/2001 | Ukechi et al. | 385/14 |
| 6,473,551 B2 | * 10/2002 | Norwood et al. | 385/130 |
| 6,487,354 B1 | * 11/2002 | Ferm et al. | 385/129 |

\* cited by examiner

Primary Examiner—Akm Enayet Ullah
Assistant Examiner—Jerry T. Rahll
(74) Attorney, Agent, or Firm—Joseph E. Maenner; Monte & McGraw, P.C.

(57) ABSTRACT

A planar optical waveguide is disclosed. The waveguide includes a substrate, a first cladding disposed on the substrate, and a first core disposed on a first portion of the first cladding. The first core is constructed from a first material. The optical waveguide also includes a second core disposed on a second portion of the first cladding, with the second core being constructed from a second material and a second cladding disposed on the first core, the second core, and a remaining portion of the first cladding. A method of manufacturing the waveguide is also disclosed.

16 Claims, 12 Drawing Sheets

METHOD OF FABRICATING POLYMER OPTICAL CHANNEL WAVEGUIDES WITH MULTIPLE TYPES OF WAVEGUIDE CORE MATERIALS

CROSS-REFERENCE TO RELATED APPLICATIONS

This application claims the benefit of U.S. Provisional Patent Application No. 60/309,849, filed Aug. 3, 2001.

FIELD OF THE INVENTION

The present invention relates to integrated optical waveguide devices and, in particular, polymer optical waveguide devices.

BACKGROUND OF THE INVENTION

Planar optical waveguides can be formed with polymers, using a core polymer and a cladding polymer, with the core polymer having a refractive index slightly higher than that of the cladding polymer. Planar optical waveguides can be used to form various optical devices such as splitters, couplers, wavelength division multiplexers/demultiplexers, electro-optic modulators, thermo-optic switches, variable optical attenuators, optical waveguide amplifiers, etc. These devices operate in the near infrared region of the optical telecommunications wavelength window, and serve as building blocks of modern optical communications networks.

A general approach to making polymer optical waveguides is to dispose several undercladding polymer film layers on a substrate and then a polymer core film layer on top of the undercladding layer. The cladding and core layer formation processes, such as spincoating and vapor deposition, result in uniform cladding and core film layers with homogeneous composition over the entire substrate. The polymer core layer film subsequently undergoes lithography and etching processes from which a rectangular cross-section core is formed. Using a photomask, the subsequent lithography and etching processes result in channel waveguides that follow the photomask pattern. Using these processes, cores with a single material type are fabricated. An overcladding polymer film layer is then put on top of the waveguide core and the undercladding.

In some device applications, such as optical waveguide amplifiers, optical lossless splitters, electro-optic modulators, etc., it is of great benefit to have the ability to fabricate channel waveguide devices with multiple types of core materials, so that integrated devices with multiple functionalities can be formed on the same waveguide substrate. Due to the homogeneous nature of the core layer film, all of the core channels are presently composed of the same core material. However, in devices where multiple functionalities must be built on the same substrate, multiple types of core materials are required. It would be beneficial to provide a planar optical waveguide in which multiple types of cores are present.

BRIEF SUMMARY OF THE INVENTION

Briefly, the present invention provides a planar optical waveguide comprising a substrate, a first cladding disposed on the substrate, and a first core disposed on a first portion of the first cladding. The first core is constructed from a first material. The optical waveguide also comprises a second core disposed on a second portion of the first cladding, with the second core being constructed from a second material and a second cladding disposed on the first core, the second core, and a remaining portion of the first cladding.

Additionally, the present invention provides a method of manufacturing a planar optical waveguide. The method comprises providing a substrate; disposing a first cladding layer over the substrate; disposing a first core material over the first cladding layer; forming a first core from the first core material, the first core being in a plane; disposing a second core material over the first cladding layer; forming a second core from the second core material, the second core being approximately in the plane of the first core; and disposing a top cladding layer over the first core, the second core, and an exposed portion of the first cladding layer.

Further, the present invention provides a method of manufacturing a planar optical waveguide. The method comprises providing a substrate; disposing a first cladding layer over the substrate; forming a first channel in the first cladding layer; disposing a first core material into the first channel; forming a second channel in the first cladding layer; disposing a second core material in the second channel; and disposing a second cladding layer on the first core material, the second core material, and at least a portion of the first cladding layer.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain the features of the invention. In the drawings.

DETAILED DESCRIPTION OF THE INVENTION

Figure 1:
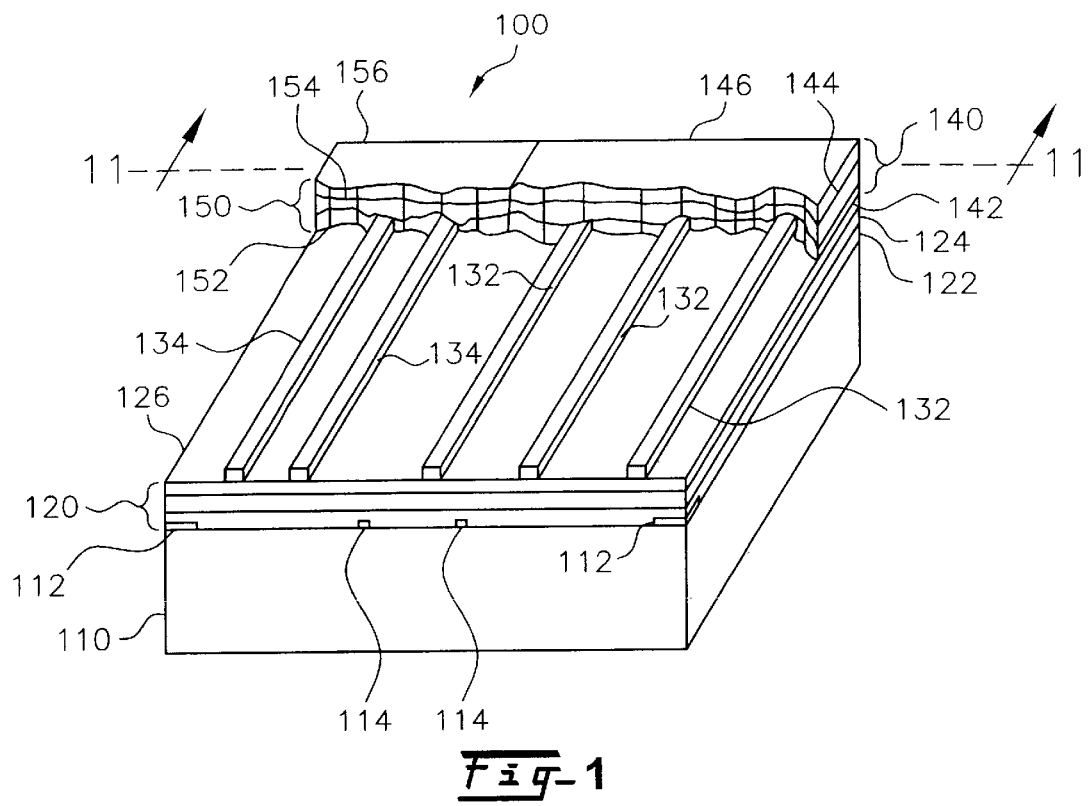
FIG. 1 is a perspective view of an optical waveguide according to a first embodiment of the present invention.

In the drawings, like numerals indicate like elements throughout. FIG. 1 shows a perspective view of a planar optical waveguide 100 according to a preferred embodiment of the present invention. The waveguide 100 includes a substrate 110, a first lower cladding 120 disposed on the substrate 110, a plurality of cores comprising a first core 132 and a second core 134 disposed on the lower cladding 120. An upper cladding is comprised of a first upper cladding 140 and a second upper cladding 150. The first upper cladding 140 is disposed on the first core 132 and portions of the lower cladding 120 not covered by the first core 132. The second upper cladding 150 is disposed on the second core 134 and other portions of the lower cladding 120 not covered by the second core 134.

Preferably, the substrate 110 is a polymer from the group consisting of polycarbonate, acrylic, polymethyl methacrylate, cellulosic, thermoplastic elastomer, ethylene butyl acrylate, ethylene vinyl alcohol, ethylene tetrafluoroethylene, fluorinated ethylene propylene, polyetherimide, polyethersulfone, polyetheretherketone, polyperfluoroalkoxyethylene, nylon, polybenzimidazole, polyester, polyethylene, polynorbornene, polyimide, polystyrene, polysulfone, polyvinyl chloride, polyvinylidene fluoride, an ABS polymer, polyacrylonitrile butadiene styrene, acetal copolymer, poly[2,2-bistrifluoromethyl-4,5-difluoro-1,3-dioxole-co-tetrafluoroethylene] (sold under the trademark TEFLON® AF), poly[2,3-(perfluoroalkenyl) perfluorotetrahydrofuran] (sold under the trademark CYTOP®), poly[2,2,4-trifluoro-5-trifluoromethoxy-1,3-dioxole-co-tetrafluoroethylene] (sold under the trademark HYFLON® AD), and any other thermoplastic polymers; and thermoset polymers, such as diallyl phthalate, epoxy, furan, phenolic, thermoset polyester, polyurethane, and vinyl ester. However, those skilled in the art will recognize that other polymers and other materials, such as silicon, can be used. Wafer dicing marks 112 and mask alignment marks 114 are disposed on the substrate 110 to provide reference locations for manufacture of the waveguide 100.

Preferably, the lower cladding 120 is a polymer, more preferably a halogenated polymer such as a fluoropolymer, and most preferably, a perfluoropolymer, including a perfluoropolymer from the group consisting of TEFLON® AF, CYTOP®, and HYFLON® AD, although those skilled in the art will recognize that other polymers or polymer blends can be used for the lower cladding 120. Also, preferably, the lower cladding 120 is applied in a series of layers 122, 124, 126, although those skilled in the art will recognize that more or less than three layers 122, 124, 126 can be used.

Preferably, the first core 132 is constructed from a first core material and the second core 134 is constructed from a second core material, different from the first core material. Also preferably, the cores 132, 134 are each a polymer, more preferably a halogenated polymer such as a fluoropolymer, and, most preferably, a perfluoropolymer. For optical amplifier applications, at least one of the cores 132, 134 is preferably a perfluoropolymer containing at least one rare earth element from the group consisting of lanthanum, cerium, praseodymium, neodymium, promethium, samarium, europium, gadolinium, terbium, dysprosium, holmium, erbium, thulium, ytterbium, and lutetium. Examples of preferred perfluoropolymers are disclosed in U.S. Pat. No. 6,292,292, U.S. patent application Ser. Nos. 09/722,821, filed Nov. 28, 2000; 09/722, 282, filed Nov. 28, 2000; and 60/314,902, filed Aug. 24, 2001, which are all owned by the assignee of the present invention and are all incorporated herein by reference in their entireties. However, those skilled in the art will recognize that other polymers containing at least one rare earth element can also be used. Further, each core 132, 134 can be a blend of polymers including at least a first polymer containing one of the rare earth elements disclosed above and at least a second polymer, such as the polymer used as the lower cladding 120. Also, each core 132, 134 preferably has a vertical cross-section of approximately between 2 and 10 microns high by between 2 and 10 microns wide to facilitate single mode signal transmission, although those skilled in the art will recognize that other dimensions may be used.

As shown in FIG. 1, the cores 132, 134 are approximately co-planar. Although FIG. 1 shows several of the first core 132 on one side of the waveguide 100 and several of the second core 134 on a distal side of the waveguide 100, those skilled in the art will recognize that the second core 134 can be interspersed with the first core 132 in any order or combination.

The first upper cladding 140 is preferably a polymer, more preferably a halogenated polymer such as a fluoropolymer, and, most preferably a perfluoropolymer. Also preferably, the first upper cladding 140 is the same polymer or polymer blend as the lower cladding 120. However, those skilled in the art will recognize that the first upper cladding 140 and the lower cladding 120 need not necessarily be the same polymer, although it is preferred that the first upper cladding 140 have the same, or nearly the same, refractive index as the lower cladding 120.

The second upper cladding 150 is preferably made from the same material as the first upper cladding 140. However, those skilled in the art will recognize that a second upper cladding 150 being constructed from a different material, but having the same, or nearly the same, refractive index as the lower cladding 120 and the first upper cladding 140 can be used.

A method of manufacturing the waveguide 100 will now be described. The planar substrate 110 is provided. Preferably, the manufacture of the waveguide 100 is accomplished when the substrate 110 is in a generally circular wafer form, with a plurality of waveguides 100 being formed from a single wafer.

Figure 2:
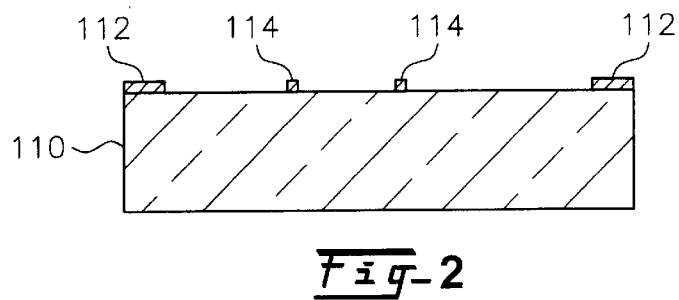
FIG. 2 is a sectional view of a substrate showing mask alignment and wafer dicing marks.

A first metal layer is disposed on the substrate 110 by vapor deposition or other known method. Preferably, the first metal layer is between approximately 0.05 and 0.5 microns thick. Preferably, the metal is aluminum, although those skilled in the art will recognize that other metals can be used. A first etching mask [not shown], composed of developed photoresist which is fabricated by standard photolithographic procedures, is disposed on top of the first metal layer and exposed metal is etched from the substrate according to known metal etching techniques. Remaining metal on the substrate 110 forms the wafer dicing marks 112 and the mask alignment marks 114, as shown in FIG. 2. During manufacture, the mask alignment marks 114 are aligned with predetermined locations on the manufacturing apparatus to properly align all of the cores 132, 134 relative to each other.

Figure 3:
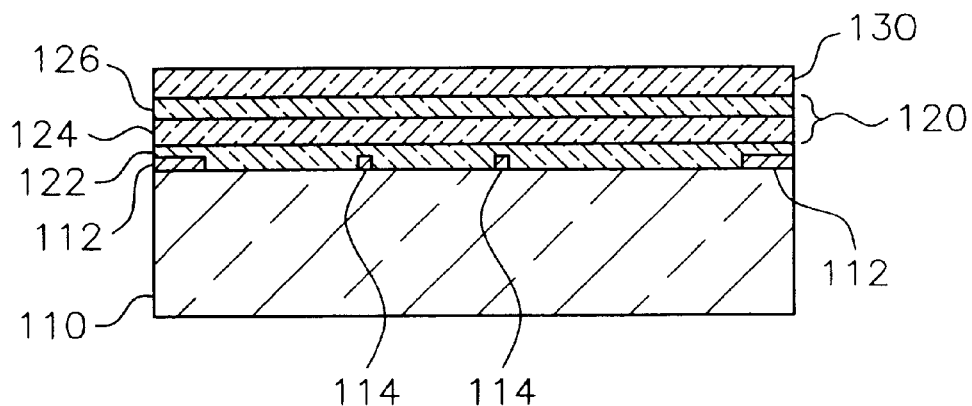
FIG. 3 is a sectional view of the substrate showing lower cladding and first core material disposed on the substrate.

The lower cladding 120 is next deposited over the substrate 110, the wafer dicing marks 112 and the mask alignment marks 114. Preferably, the lower cladding 120 is deposited by spincoating or other known technique, and is comprised of several layers, 122, 124, 126 as shown in FIG. 3, although those skilled in the art will recognize that more or less than three layers 122, 124, 126 can be used. Preferably, the lower cladding 120 is between approximately 10 and 20 microns thick, although those skilled in the art will recognize that the lower cladding 120 can have a thickness greater or lesser than that amount. After the lower cladding 120 dries, a first core material 130 is deposited over the lower cladding 120, again, preferably by spincoating or other known technique. Preferably, the first core material 130 is deposited as a single layer, between approximately 2 and 10 microns thick.

Figure 4:
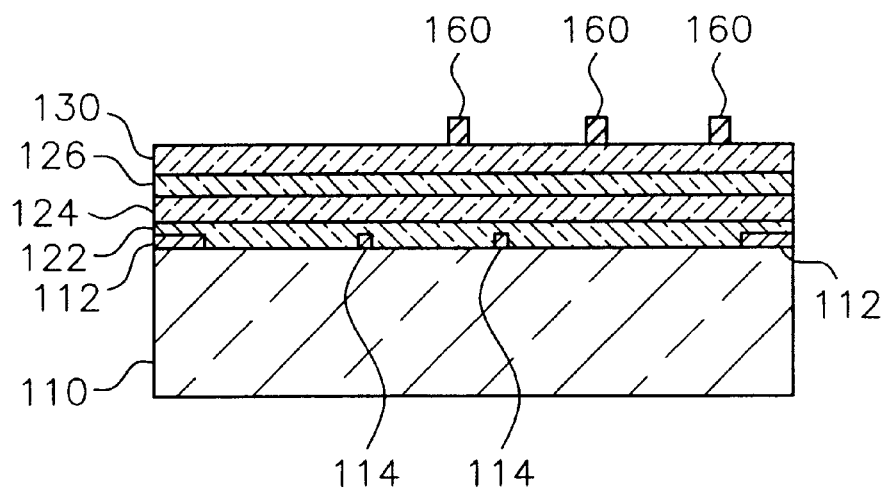
FIG. 4 is a sectional view of the substrate with a metal mask disposed on the first core material.

A second metal layer is deposited over the first core material 130, preferably in a manner similar to the deposition of the first metal layer over the substrate 110. A second etching mask (not shown), composed of developed photoresist which is fabricated by standard photolithographic procedures, is applied over the second metal layer. The second etching mask corresponds to a desired first core pattern. The second metal layer is etched so that only a predetermined mask shape 160, as shown in FIG. 4, remains.

Figure 5:
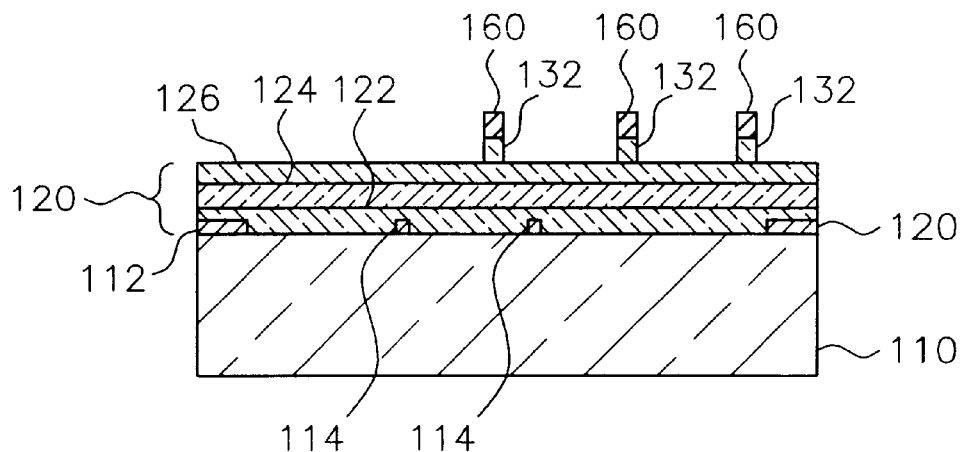
FIG. 5 is a sectional view of the substrate with the first core material removed according to contours of the metal mask.
Figure 6:
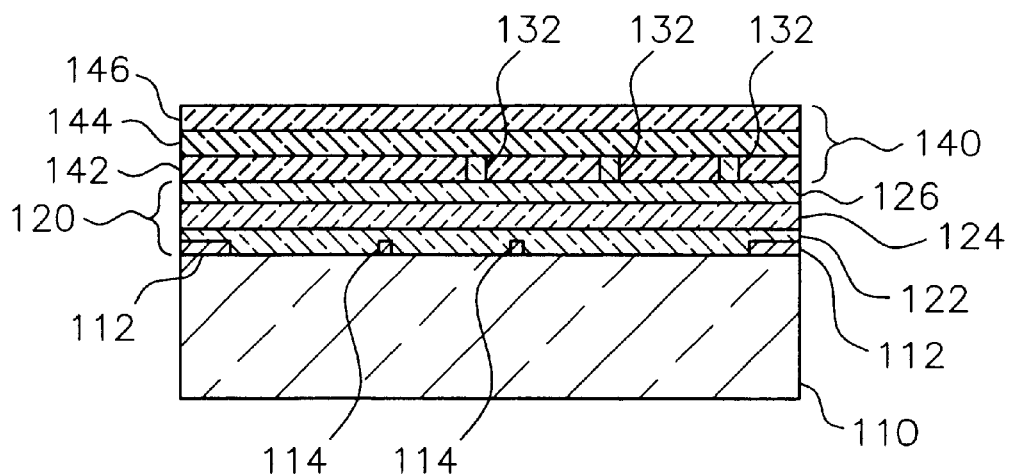
FIG. 6 is a sectional view of the substrate with a first top cladding disposed on the first core material and the lower cladding.

The mask shape 160 acts as a mask for the first core layer 130, which is then etched so that only the first core 132, as shown in FIG. 5, remains. After the first core 132 is formed, the mask shape 160 is removed by conventional methods. The first top cladding 140 is then deposited over the first core 132 and the lower cladding 120. Preferably, the first top cladding 140 is spincoated in a plurality of layers 142, 144, 146 in a manner similar to the lower cladding 120 as described above, and is shown in FIG. 6.

Figure 7:
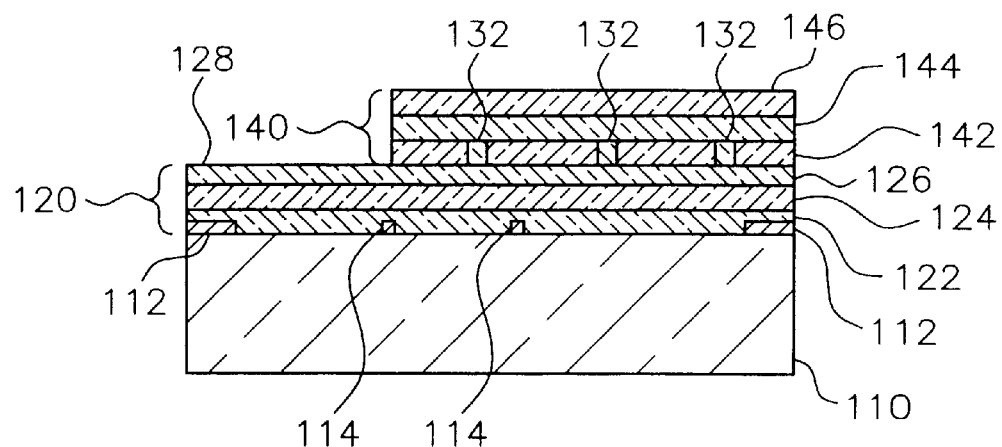
FIG. 7 is a sectional view of the substrate with a portion of the first top cladding removed, exposing a portion of the lower cladding.
Figure 8:
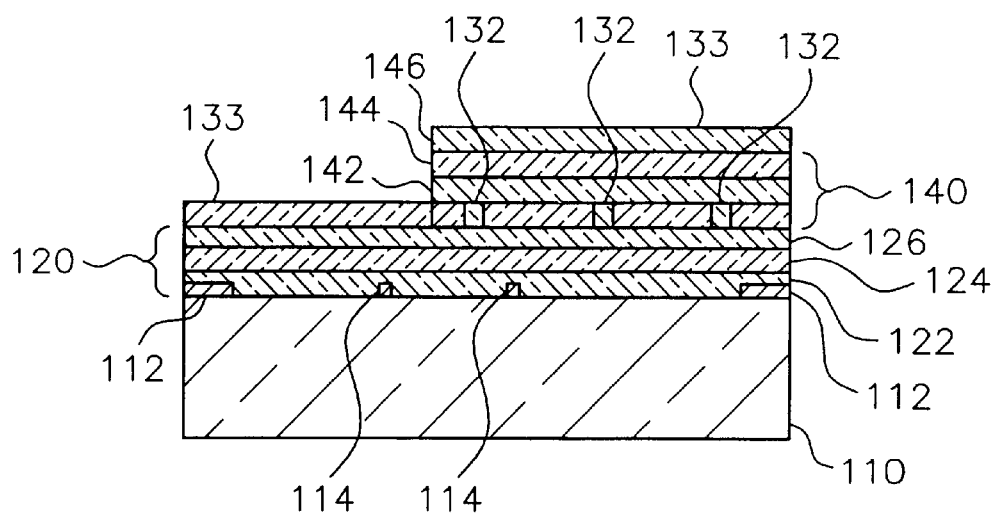
FIG. 8 is a sectional view of the substrate with a second core material disposed on the first top cladding and the exposed lower cladding.

A third etching mask (not shown) is applied over the first top cladding 140. A portion of the first top cladding 140, distal from the first cores 132, is then removed from the waveguide 100, exposing a surface 128. The lower cladding 120 is preferably exposed where the first upper cladding 140 is removed, as shown in FIG. 7, although those skilled in the art will recognize that a portion of the first top cladding 140 may remain, and the surface 128 is thus constructed from the first upper cladding 140. A second core material 133 is then deposited over the first upper cladding 140 and the exposed surface 128, preferably by spincoating or other known technique, as shown in FIG. 8.

Figure 9:
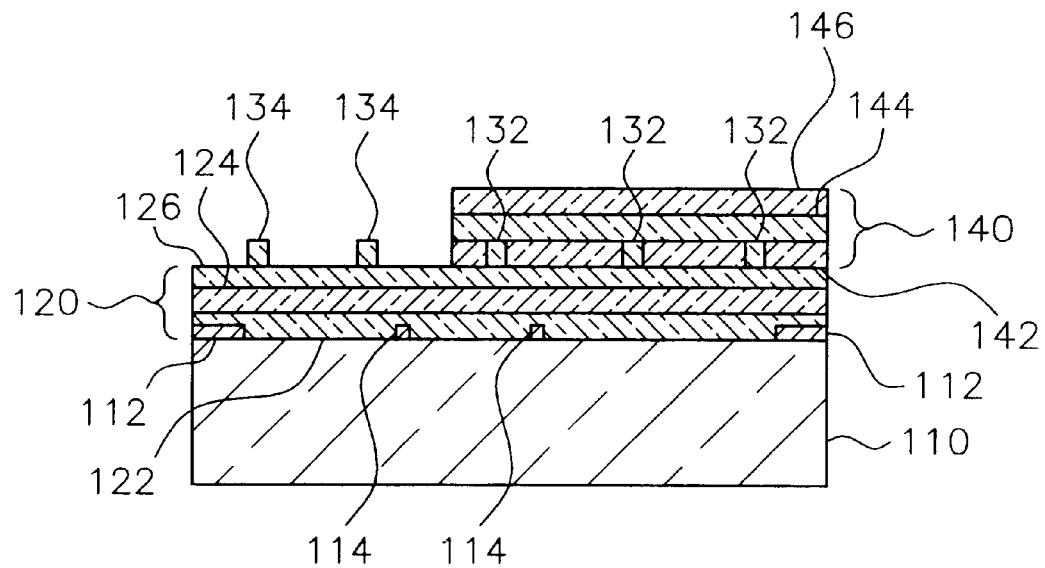
FIG. 9 is a sectional view of the substrate with the second core material having been formed in a desired shape on the exposed lower cladding.

A metal (not shown) is disposed over the second core material 133 and a fourth etching mask (not shown), composed of developed photoresist which is fabricated by standard photolithographic procedures, is applied over the metal. The metal and, subsequently, the second core material 133, are etched according to the pattern of the fourth etching mask to form the second core 134, preferably in the same manner as the first core 132, as described above. The second core 134 is shown in FIG. 9.

Figure 10:
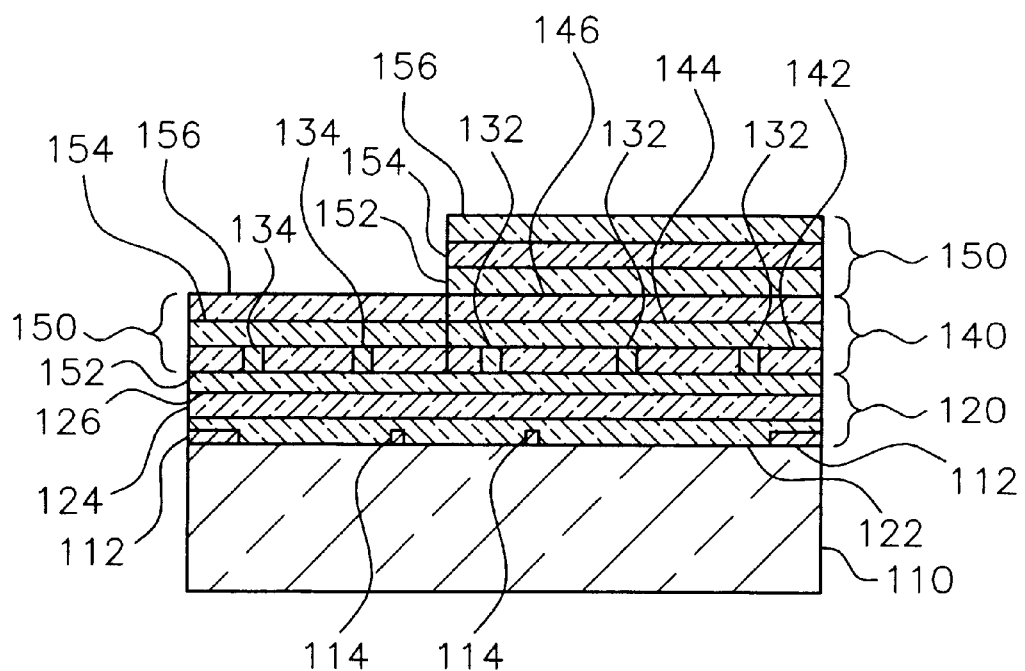
FIG. 10 is a sectional view of the substrate with a second top cladding disposed on the second core material, the exposed lower cladding, and the first top cladding.

The second upper cladding 150 is then deposited over the first upper cladding 140, exposed lower cladding 120, and the second core 134, as shown in FIG. 10. Preferably, the second upper cladding 150 is deposited in a manner similar to the deposition of the first upper cladding 140, as described above.

Figure 11:
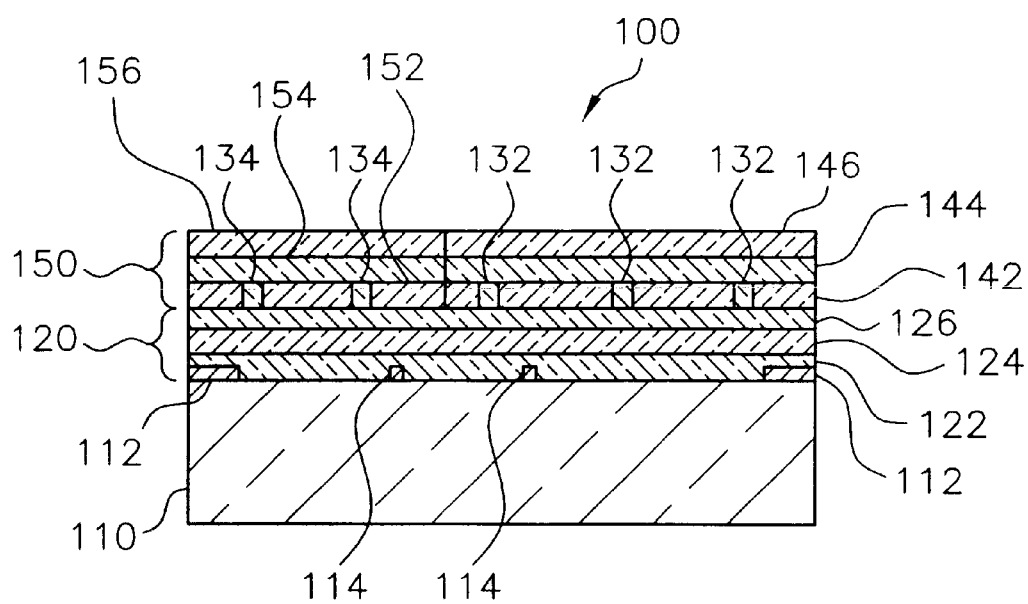
FIG. 11 is a sectional view of the optical waveguide, taken along section lines 11—11 of FIG. 11.

Preferably, although not necessarily, the portion of the second upper cladding 150 deposited on the first upper cladding 140 is removed, preferably by an etching process similar to the etching process described above with respect to the removal of the first upper cladding 140, as shown in FIG. 11. After manufacture, the plurality of waveguides 100 are cut along the wafer dicing marks 112 to provide individual waveguides 100.

Figure 12:
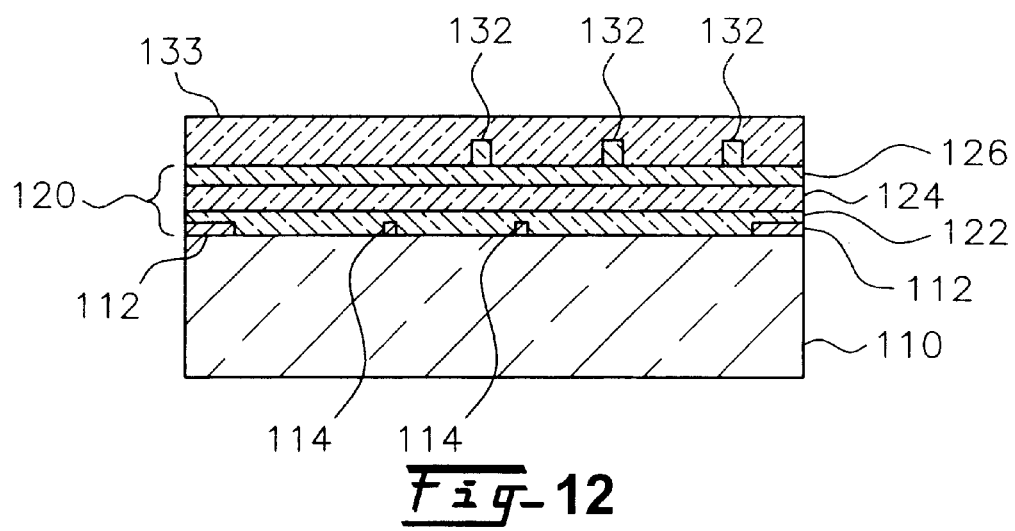
FIG. 12 is a sectional view of the substrate with the second core material disposed on the first core and the exposed lower cladding.

An alternative method of manufacturing a waveguide 100' similar to the waveguide 100 is described. After the first cores 132 are formed as shown in FIG. 5, and after the mask shape 160 is removed, instead of disposing the first top cladding 140 over the first core 132 and the lower cladding 120, the second core material 133 is disposed over the first core 132 and the lower cladding 120, as shown in FIG. 12.

Figure 13:
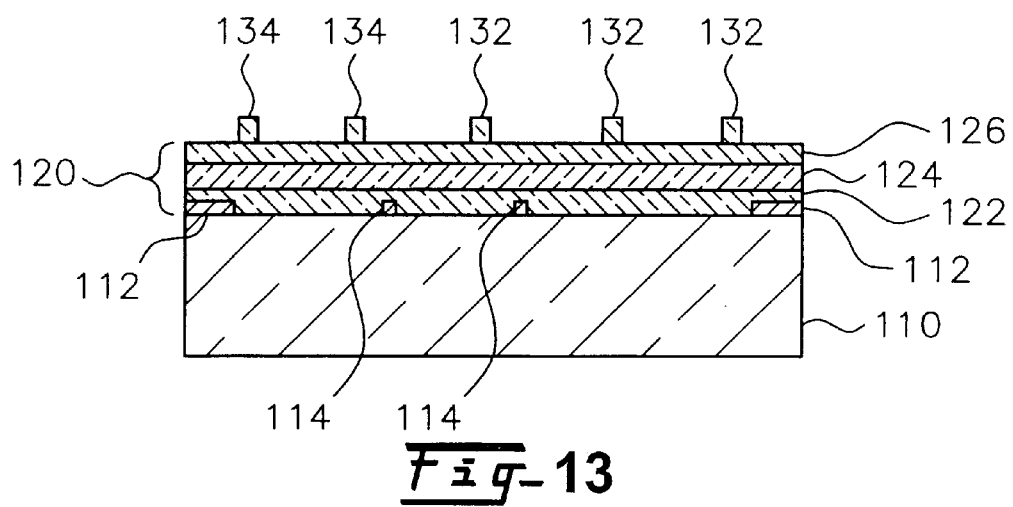
FIG. 13 is a sectional view of the substrate with the second core material having been formed in a desired shape on the lower cladding.

The second core material 133 is then etched to form the second core 134. The second core material 133 can be etched is several alternative methods, such as by first etching the second core material 133 above the plane of the first core 132, and then by etching the second core material 133 generally co-planar with the first core 132, forming each of the second cores 134. Alternatively, the second core material 133 can be etched generally down to the lower cladding 120 around each of the cores 132, 134 and then down to the top of each of the cores 132, 134. By either method, generally only the cores 132, 134 remain on top of the lower cladding 120, as shown in FIG. 13.

Figure 14:
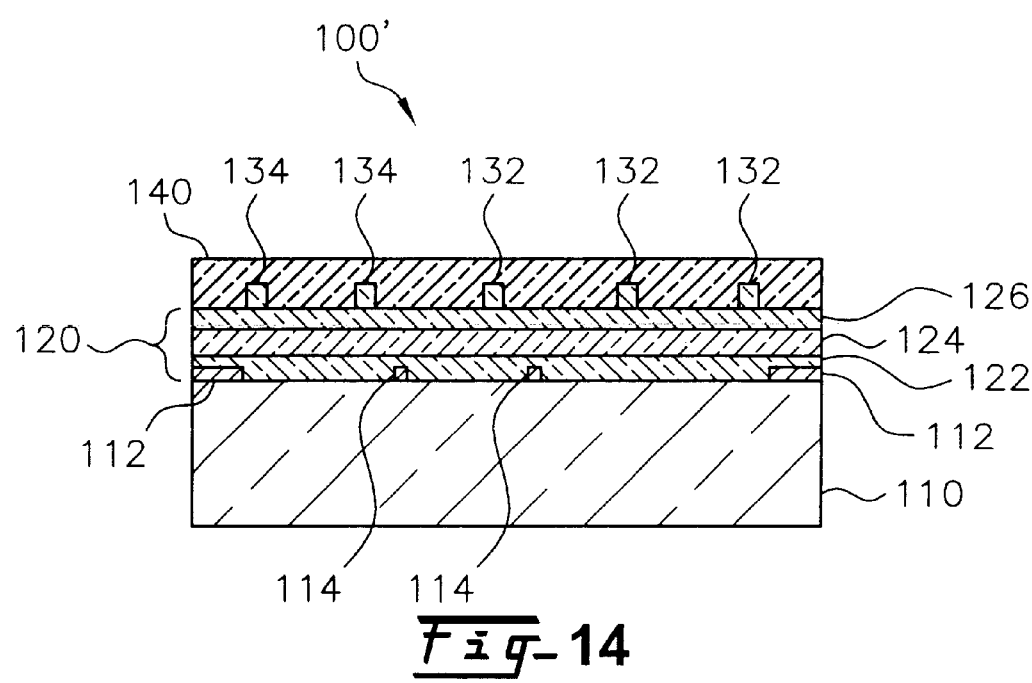
FIG. 14 is a sectional view of the substrate with the top cladding disposed over the cores and the exposed lower cladding.

The first upper cladding 140 is then disposed on top of the cores 132, 134 and exposed lower cladding 120, as shown in FIG. 14. Although only one layer of the upper cladding 140 is shown in FIG. 14, those skilled in the art will recognize that a plurality of layers of the upper cladding 140 can be applied. The second upper cladding 150, shown in FIG. 10, is not necessary and is thus eliminated.

Figure 15:
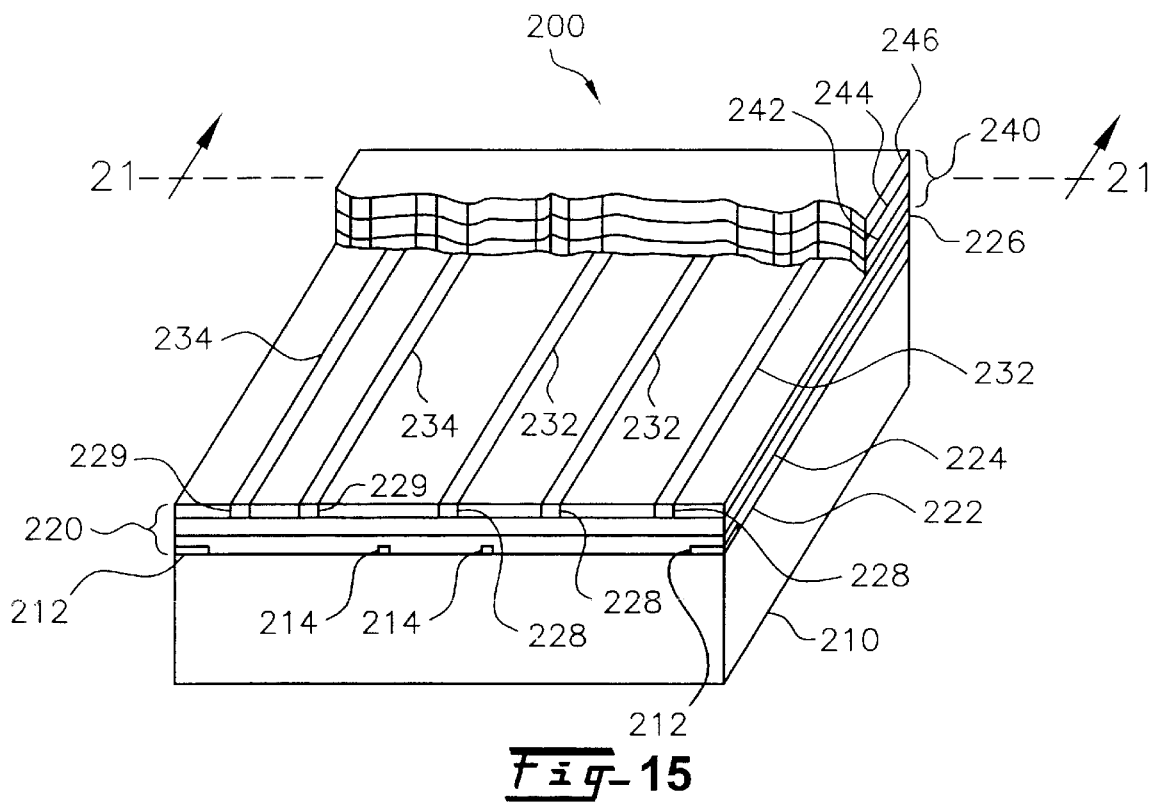
FIG. 15 is a perspective view of an optical waveguide according to another embodiment of the present invention.

The waveguides 100, 100' described above are generally described as ribbed waveguides, in which the cores 132, 134 are formed as ribs on the lower cladding 120. Alternatively, a channel waveguide 200, shown in FIG. 15 is constructed from cores 232, 234 embedded in channels 228, 229, respectively, formed a lower cladding 220.

The waveguide 200 includes a substrate 210; the lower cladding 220, preferably comprised of a plurality of layers 222, 224, 226; a plurality of cores comprising the first core 232 and the second core 234 deposited in channels 228, 229 formed in the lower cladding 220; and an upper cladding 240 disposed on the cores 232, 234 and portions of the lower cladding 220 not covered by the cores 232, 234.

Preferably, the materials for the elements comprising the waveguide 200 are the same or similar to respective counterpart elements in the waveguide 100. For example, the substrate 210 is constructed from the same material as the substrate 110. Similar to the first embodiment, wafer dicing marks 212 and mask alignment marks 214 are disposed on the substrate 210 to provide reference locations for manufacture of the waveguide 200.

Figure 16:
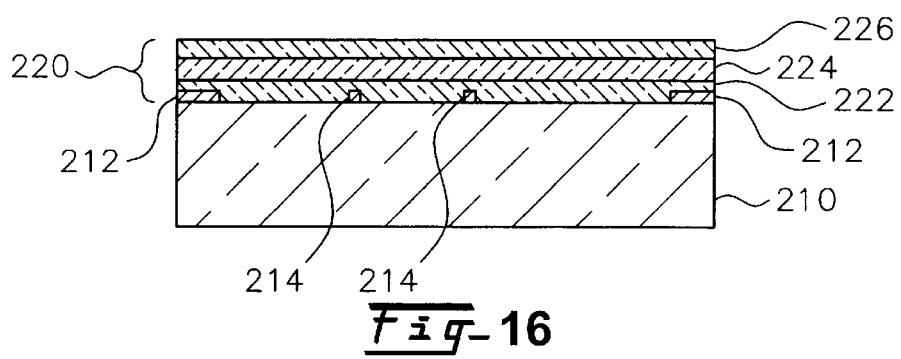
FIG. 16 is a sectional view of the substrate with the lower cladding disposed on the substrate.

A method of manufacturing the waveguide 200 will now be described. The substrate 210, the wafer dicing marks 212, the mask alignment marks 214, and the lower cladding 220 are prepared as described above with respect to the waveguide 100, as shown in FIG. 16.

Figure 17:
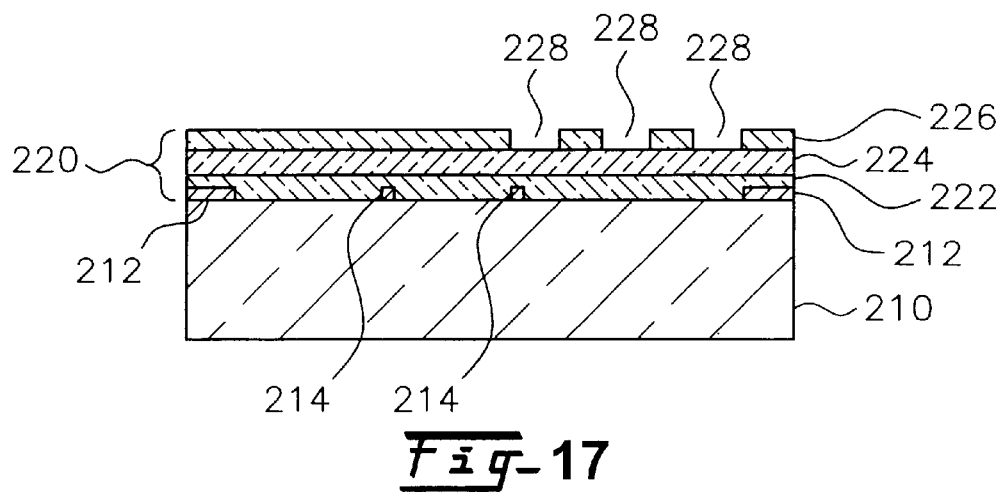
FIG. 17 is a sectional view of the substrate with channels for the first cores formed in the lower cladding.
Figure 18:
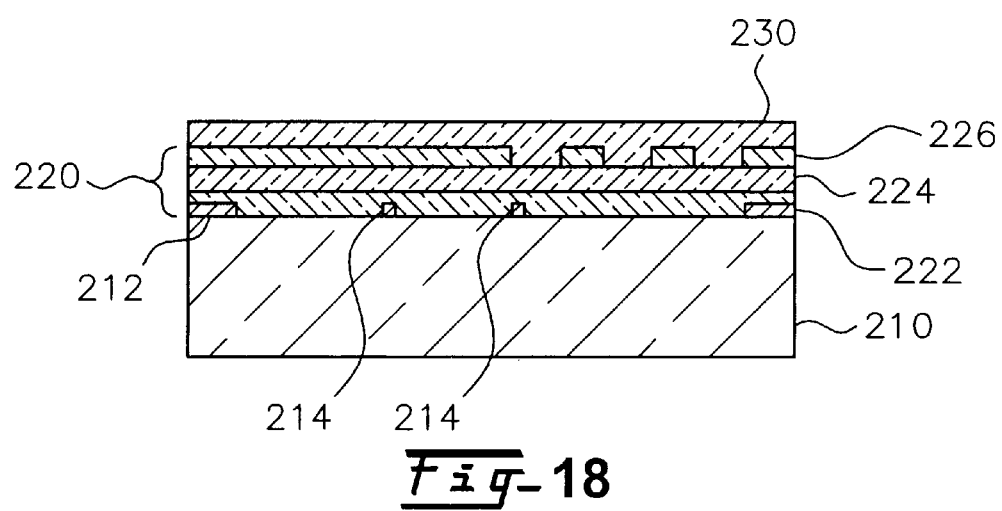
FIG. 18 is a sectional view of the substrate with first core material disposed on the lower cladding.

A plurality of channels 228 are formed in the top layer 226 of the lower cladding 220, as shown in FIG. 17. Preferably, the channels are formed by etching the top layer 226, although those skilled in the art will recognize that the channels 228 can be formed by other methods, such as by molding. As seen in FIG. 18, first core material 230 is disposed on the lower cladding 220, preferably by spin coating. A portion of the first core material 230 fills the channels 228. Remaining core material 230 is disposed over the lower cladding 220.

Figure 19:
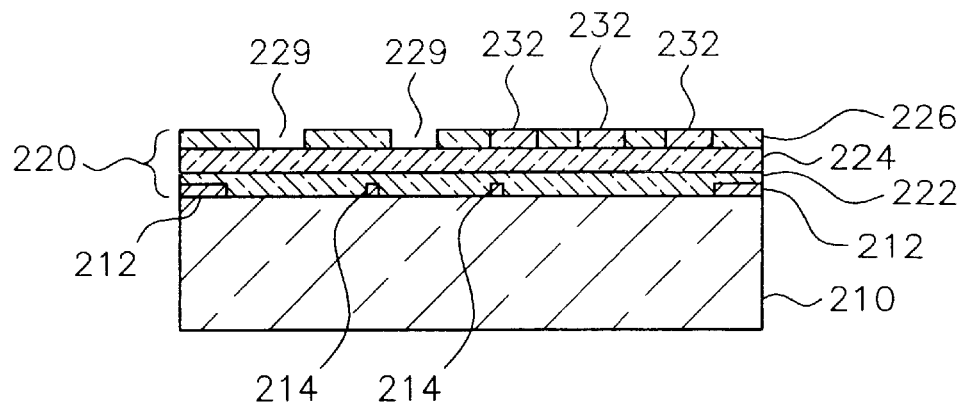
FIG. 19 is a sectional view of the substrate with the first cores and channels for the second cores formed in the cladding.
Figure 20:
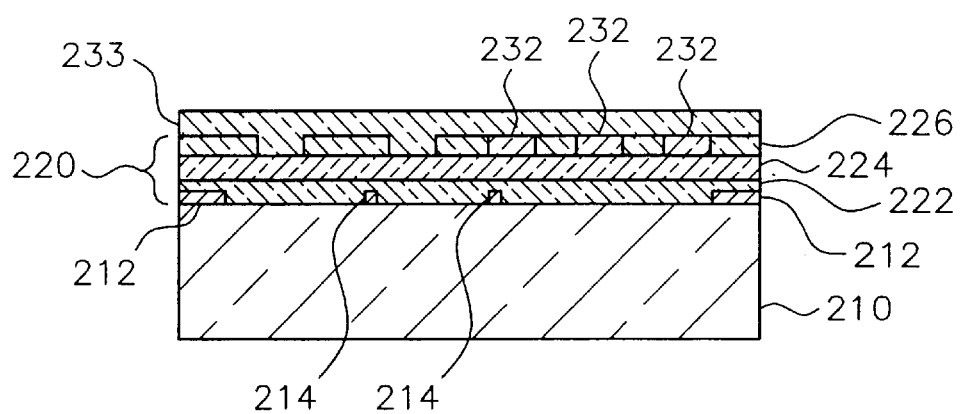
FIG. 20 is a sectional view of the substrate with the second core material disposed on the lower cladding.

Preferably, next, excess first core material 230 is etched down to the level of the lower cladding 220 along the entire length of the first core material 230, forming the first core 232 in the lower cladding 220. A plurality of channels 229 are then etched in the lower cladding 220, as shown in FIG. 19. The second core material 233 is then disposed on top of the first core 232 and the lower cladding 220, filling in the channels 229, as shown in FIG. 20.

Figure 21:
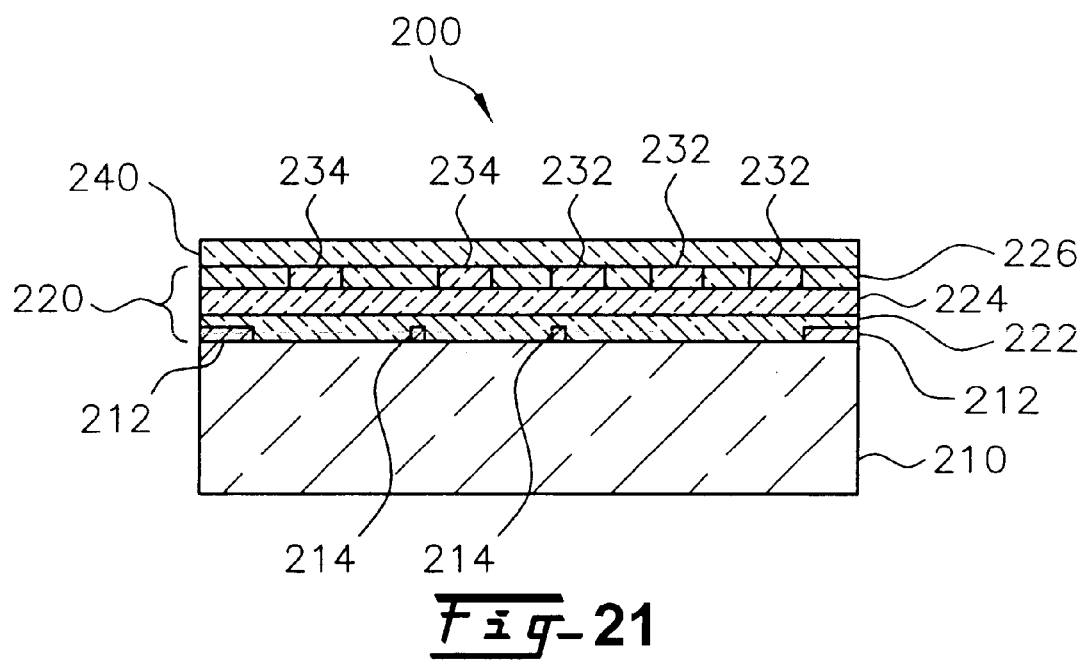
FIG. 21 is a sectional view of the optical waveguide, taken along section lines 21—21 of FIG. 15.

Excess second core material 233 is then etched down to the level of the lower cladding 220 along the entire length of the second core material 233, forming the second cores 234. The upper cladding 240 is deposited over the cores 232, 234 and the lower cladding 220, forming the waveguide 200, as shown in FIG. 21. Although only one layer of the upper cladding 240 is shown in FIG. 21, those skilled in the art will recognize that a plurality of layers of the upper cladding 240 can be applied.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A planar optical waveguide comprising:
   a substrate;
   a first cladding disposed on the substrate;
   a first core disposed on a first portion of the first cladding, the first core being constructed from a first polymer;
   a second core disposed on a second portion of the first cladding, the second core being constructed from a second polymer; and
   a second cladding disposed on the first core, the second core, and a remaining portion of the first cladding.

2. The planar optical waveguide according to claim 1, wherein the substrate is a polymer.

3. The planar optical waveguide according to claim 1, wherein the first polymer contains at least one additional element within the polymer.

4. The planar optical waveguide according to claim 1, wherein the polymer contains a rare earth element.

5. The planar optical waveguide according to claim 1, wherein the first and second cores are sized to transmit single mode light.

6. The planar optical waveguide according to claim 1, further comprising at least one alignment mark disposed on the substrate.

7. The planar optical waveguide according to claim 1, wherein the first and second cores are approximately co-planar.

8. A planar optical waveguide comprising:
   a substrate;
   a first cladding disposed on the substrate;
   a first core disposed on a first portion of the first cladding, the first core being constructed from a first core polymer material;
   a second core disposed on a second portion of the first cladding, the second core being constructed from a second core polymer material; and
   a second cladding disposed on the first core, the second core, and a remaining portion of the first cladding;
   wherein the waveguide is manufactured by:
   providing the substrate;
   disposing the first cladding layer over the substrate;
   disposing the first core polymer material over the first cladding layer;
   forming the first core from the first core polymer material, the first core being in a plane;
   disposing the second polymer material over the first cladding layer;
   forming the second core from the second core polymer material, the second core being approximately in the plane of the first core; and
   disposing the second top cladding layer over the first core, the second core, and an exposed portion of the first cladding layer.

9. A method of manufacturing a planar optical waveguide comprising:
   providing a substrate;
   disposing a first cladding layer over the substrate;
   disposing a first core polymer material over the first cladding layer;
   forming a first core from the first core polymer material, the first core being in a plane;
   disposing a second core polymer material over the first cladding layer;
   forming a second core from the second core polymer material, the second core being approximately in the plane of the first core; and
   disposing a top cladding layer over the first core, the second core, and an exposed portion of the first cladding layer.

10. The method according to claim 9, further comprising, after forming the first core, disposing a second cladding layer over the first core and the first cladding layer.

11. The method according to claim 10, further comprising, after disposing the second cladding layer, removing a portion of the second cladding layer distal from the first core, exposing a surface.

12. The method according to claim 11, wherein disposing the second core polymer material further comprises disposing the second core material over the second cladding layer.

13. The method according to claim 9, further comprising removing a portion of the top cladding layer distal from the second core.

14. The method according to claim 9, wherein providing the substrate comprises providing a polymer substrate.

15. The method according to claim 9, wherein disposing the first core polymer material comprises disposing the first core polymer material containing a rare earth element.

16. The method according to claim 9, further comprising, prior to disposing the first core material, providing alignment marks on the substrate.

* * * * *

UNITED STATES PATENT AND TRADEMARK OFFICE
CERTIFICATE OF CORRECTION

PATENT NO.     : 6,724,969 B2
DATED          : April 20, 2004
INVENTOR(S)    : Renyuan Gao et al.

It is certified that error appears in the above-identified patent and that said Letters Patent is hereby corrected as shown below:

<u>Title page,</u>
Item [75], Inventors, delete "Joseph E. Maenner".

Signed and Sealed this

Eighth Day of June, 2004

JON W. DUDAS
*Acting Director of the United States Patent and Trademark Office*